Aug. 4, 1953  G. F. WALES  2,647,749
INSTRUCTION ACCESSORY FOR CHESS GAMES
Filed March 20, 1950  5 Sheets-Sheet 1

INVENTOR.
GEORGE F. WALES
BY Edwin B. Gary
Attorney.

Aug. 4, 1953   G. F. WALES   2,647,749
INSTRUCTION ACCESSORY FOR CHESS GAMES
Filed March 20, 1950   5 Sheets-Sheet 4

INVENTOR.
GEORGE F. WALES
BY Edwin B. Gary
Attorney.

Aug. 4, 1953 G. F. WALES 2,647,749
INSTRUCTION ACCESSORY FOR CHESS GAMES
Filed March 20, 1950 5 Sheets-Sheet 5
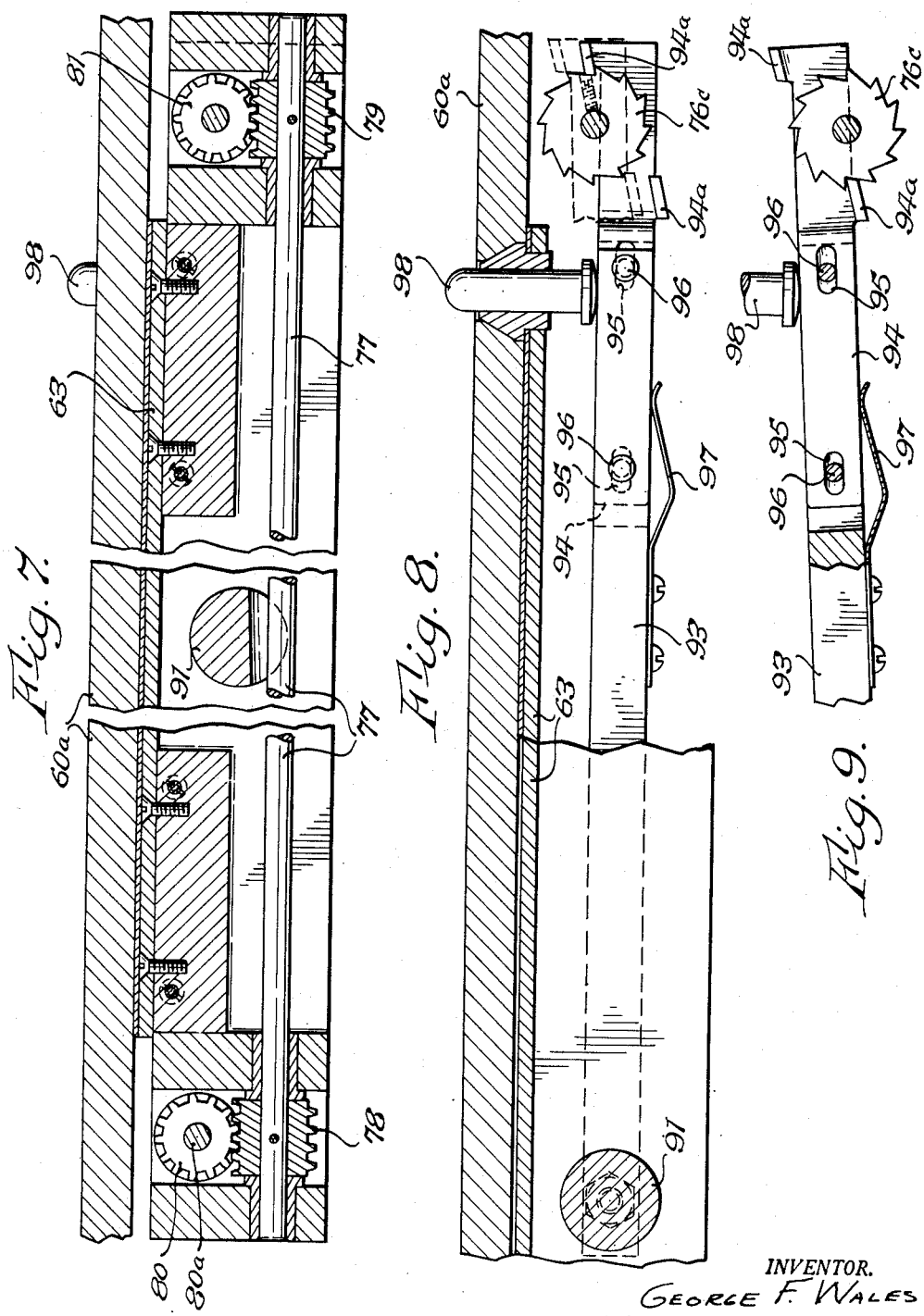
INVENTOR.
GEORGE F. WALES
BY
Edwin B. Gary
Attorney.

Patented Aug. 4, 1953

2,647,749

UNITED STATES PATENT OFFICE 2,647,749

INSTRUCTION ACCESSORY FOR CHESS GAMES

George F. Wales, Kenmore, N. Y.

Application March 20, 1950, Serial No. 150,671

12 Claims. (Cl. 273—136)

This invention relates to an instruction and an educational device which, although not necessarily so limited, is characterized by features which render it of particular utility for indicating and recording the moves of the game pieces, or men, of various games of position such as chess, checkers and the like, whereby to facilitate the study of such games and in so doing enable the novice and the expert to acquire knowledge and gain skill in a highly interesting and entertaining manner.

Heretofore, it has been proposed to impart knowledge of chess, checkers and similar games by means of record forms associated with boards upon which the games may be played. For example, the Howell Patent No. 529,913 proposes to teach chess, checkers and the like by means of a record marked with a pattern of numbers which indicates each game piece and its position, the pattern of numbers being repeated unchanged for each move except for the particular game piece which is to be moved. Howell's device, therefore, has the disadvantage that the numbers are difficult to observe through the sixty-four small windows in the game board. There is the further disadvantage that the entire board must be scanned before it can be determined which particular game piece is to be moved.

The Ortiz Patent No. 1,532,069 discloses a game instruction device similar to that shown in the Howell patent in the respect that printed records are associated with the game board. The record shown in the Ortiz patent, however, indicates moves by means of arrows which are visible through the transparent game board. In the use of this device, the record must be moved a distance equal to the dimensional extent of the board in the direction of travel of the record and visually aligned to assure the arrows indicating the correct origin and destination of each move. Obviously, the necessity for moving the record such a large distance for each move is a disadvantage as is the inability to record moves on the record, this latter disadvantage also being characteristic of the instruction device of the Ortiz patent and of other prior art devices.

The principal object of the present invention, therefore, is to overcome the above and other objections to the devices of the prior art, this object contemplating an instruction device having a record through which the men and squares of the game board (either or both) may be illuminated in such a manner that the moves of the game will be clearly indicated.

Another object of this invention is to provide a game instruction device which may be availed of to record the moves of a game in such a manner that such game, or moves thereof, may be replayed at any time, it being understood that the device is available for use in connection with records of past games, and other records, which may be prepared while playing, for purposes of education, instruction and entertainment.

A related object is to provide a device characterized by features which facilitate identification of the game piece involved in any particular move, its origin and its destination.

A still further object is to provide a device which may be utilized to indicate or record, either or both, the moves of the game pieces of a game of the character described.

Yet another object is to provide a device wherein with respect to any particular move only the origin and destination of the particular game piece involved is indicated or recorded, there being provision, however, for indication or recording at any stage of play the positions of all of the game pieces.

A further object is a device wherein provision is made for indicating the positions of all of the game pieces in the game, at any stage of play, while requiring only two indicia for designating any particular move.

A related object is to provide a device wherein either the origination, destination or game piece may be revealed while concealing the other elements of the game move, the concealed elements being revealed on subsequent operation of the device.

A still further object is to provide a device wherein the indicia on the record form may be simple perforations, readily made and adapted to provide light-transmitting apertures which serve to indicate the origin and destination of the moves of each game piece.

A further important object of the invention is to provide a device wherein the game board area and the record form are so related that the capacity of the record form with respect to the number of indicia which it may carry is greatly increased, this having the advantage that the number of games or moves which a record form may carry is correspondingly increased and having the further advantage that the distance which the record form is advanced between moves is of such a small magnitude that such movements may be effected rapidly and accurately with simple feed mechanisms.

A still further object is to provide a device having a positive and accurate mechanism for moving the record form.

A related object is a device wherein provision is made for accurately registering the record form with the above mentioned mechanism.

A still further object is a novel design and arrangement of the parts of the device, whereby to insure simplicity in construction and accuracy and dependability in operation and whereby to provide a device which is highly attractive and ornamental in appearance.

The invention is illustrated in the accompanying drawings, wherein:

Figure 7 is a similar fragmentary sectional view taken along line 7—7 of Figure 3;

Figure 8 is an enlarged fragmentary, detail section taken along line 8—8 of Figure 3 and illustrates the mechanism for feeding the record form at one limit of its range of movement; and Figure 9 is a view similar to Figure 8 and illustrates the mechanism for feeding the record form at the other limit of its range of movement.

Figure 1:
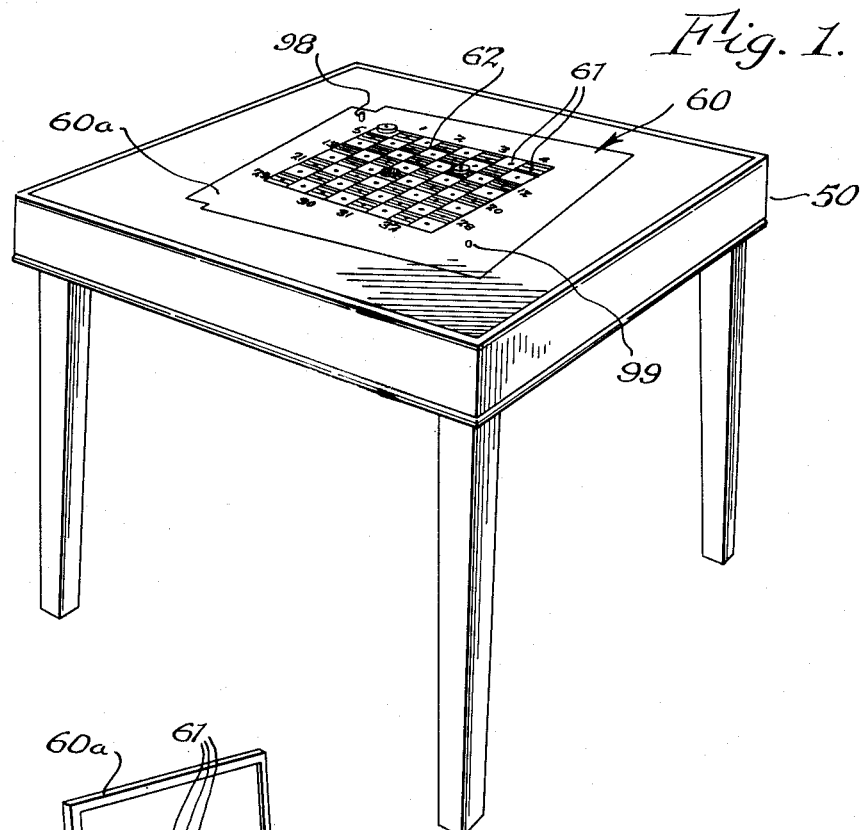
Figure 1 is a perspective view of a device embodying the features of the invention.
Figure 2:
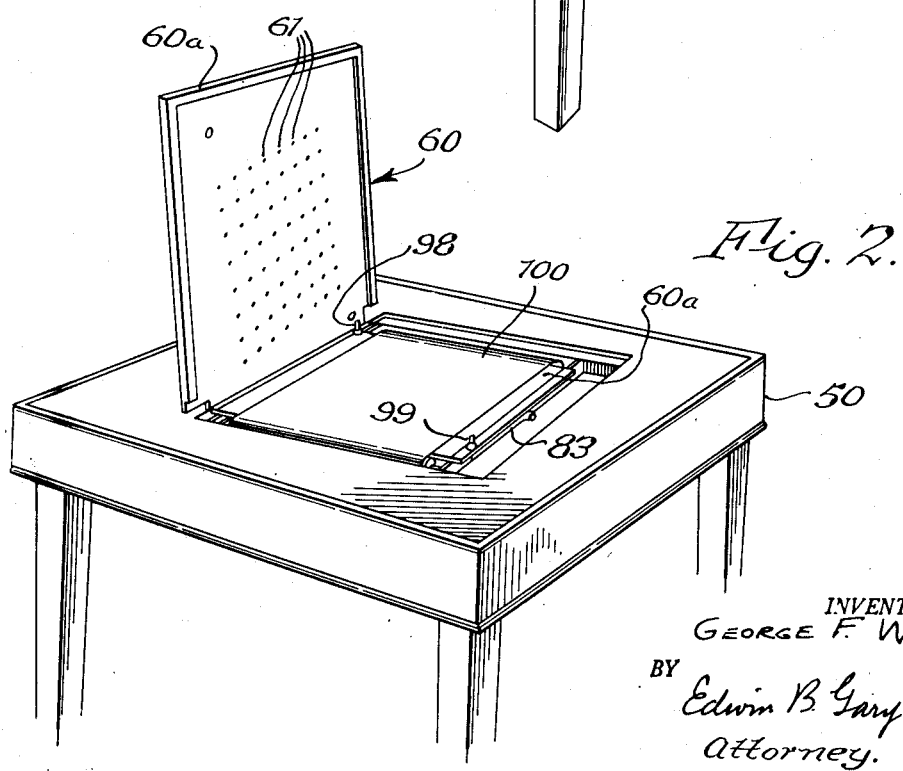
Figure 2 is a view similar to Figure 1, but with the game-board cover opened to expose a record and other normally concealed parts of the device.

The device, which is indicated at 60, may, as illustrated in Figures 1 and 2, be carried by a table 50, the device constituting the central area of the top of the table and having a checkered surface 62, every other square of such surface being numbered from 1 through 32, in accordance with conventional practice, to facilitate identification of the playing pieces and the designation of moves in the instruction and description of the game of checkers. Preferably, the playing area described is carried by a cover 60a which, as noted, is shown open in Figure 2 and which is perforated as at 61 so that a light aperture or window will be formed in the cover substantially centrally of each of the sixty-four squares of the checkered playing area.

Figure 6:
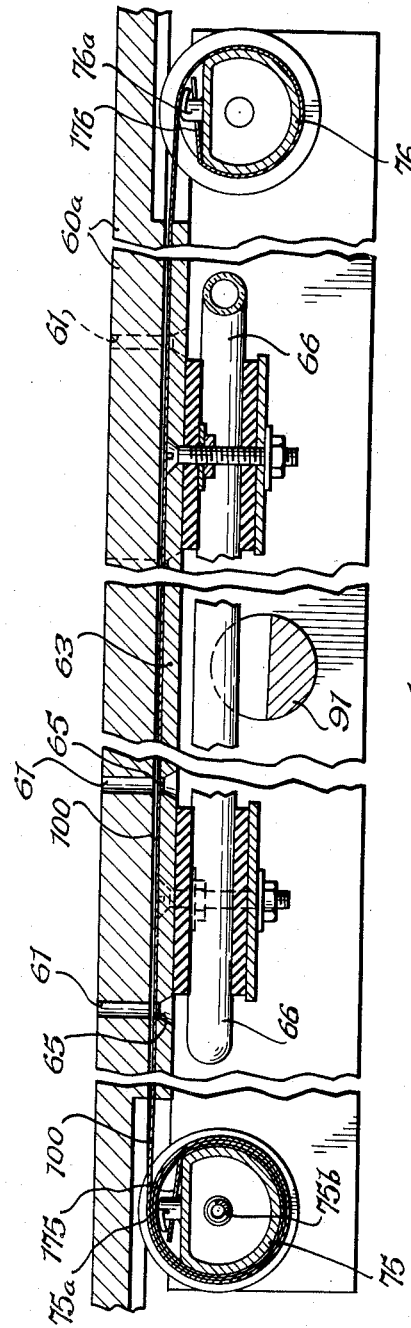
Figure 6 is a similar fragmentary sectional view taken along line 6—6 of Figure 3.

In its closed position, as best shown in Figure 6, the cover 60a overlies a record strip 100, the latter being carried by feed rolls 75 and 76 which are mounted between side frame members of the device and being movable over a die plate 63. Apertures 65 are formed in the die plate 63 below and in co-axial relation with respect to the apertures 61 in the cover 60a. A luminescent tube 66 is suitably secured to the underside of the die plate 63, the said tube preferably being of the sinuous outline shown in Figure 4 so that legs thereof will be located below each of the series of aligned perforations in the cover 60a and die plate 63. It will be apparent, therefore, that with the apertures in the cover and die plate located in the relation described, any perforation in the record strip which moves into registering relation with a pair of such apertures, as indicated in Figure 6, will result in an unobstructed path through the aligned apertures for light from the light source 66.

The invention contemplates the preparation of a record strip 100 by perforation or by light transmitting spots in the record in such a manner that light emitted from the light source 66 may be availed of to indicate the location of the game piece involved in any particular play, hence the position from which it is to be moved, and also its destination. Preferably, the indicia on the record strip is such that only the origin and destination of the game piece involved in any particular move is indicated, as in most instances any reference to the other playing pieces would serve no useful purpose. However, the invention also contemplates perforating, or otherwise marking the record strip 100, in such a manner that from time to time the positions of all of the playing pieces will be indicated. The positions of the playing pieces of each player may be indicated in different stages or in the same stage. In this connection, it will be appreciated that the record strip employed may be either pre-perforated, or pre-marked, in order that previously played games, or moves thereof, may be indicated for purposes of illustration, instruction and entertainment. The invention, however, contemplates the use of the device to record the moves of a game in the course of the actual playing of the game. The construction described has the advantage that the necessary perforations may be made by a stylus or any suitable form of punching instrument or they may be made by perforating game pieces of the character shown in my co-pending application Serial No. 155,150. Thus the record may be perforated at the position corresponding to the location of the game piece which is moved in any particular play and again perforated at the final position of the game piece. Thereafter, the record strip is advanced one step before the procedure described is repeated with respect to the succeeding move by an opposing player.

Figure 3:
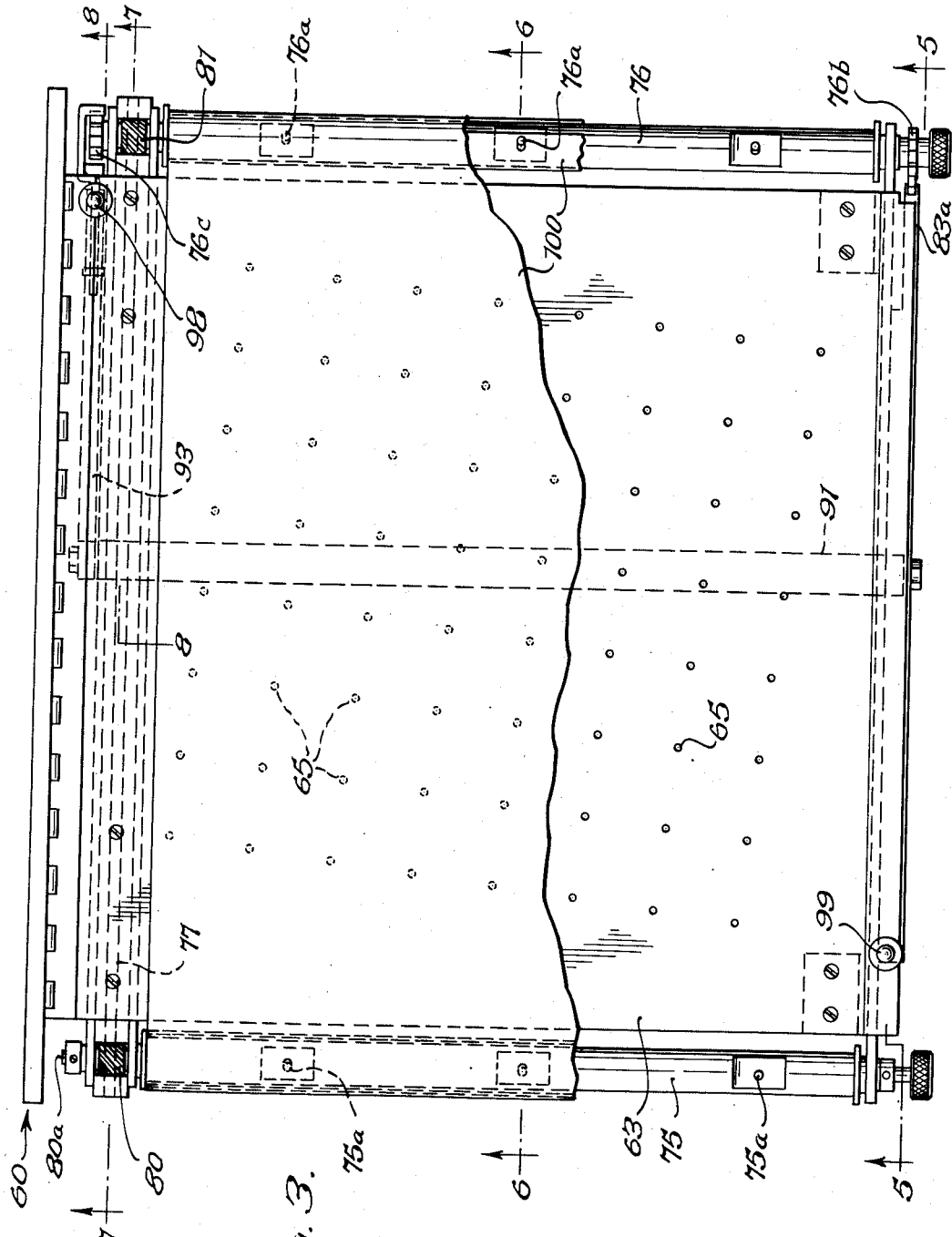
Figure 3 is a top plan view of the device which is shown removed from the table and which illustrates the feeding mechanism for the record form and the apertures in the die plate through which light is transmitted from the light source.
Figure 4:
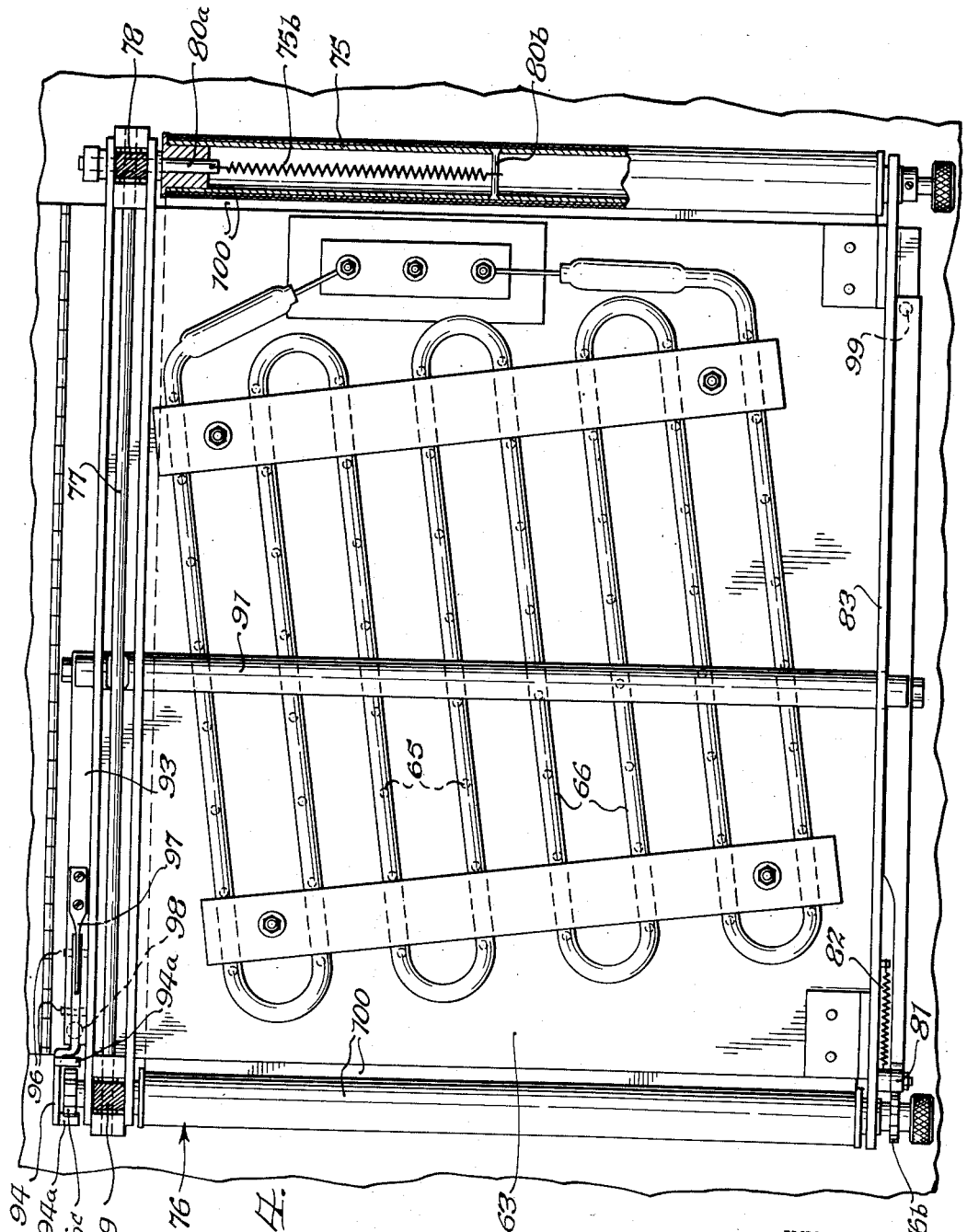
Figure 4 is a bottom view which illustrates a specific type of light source, the feed mechanism for the record form and the take-up arrangement which is incorporated in one of the feed rolls.

Referring to Figures 3 and 6, it will be noted that the record strip 100 is stretched between the rolls 75 and 76, the said rolls having driving pins 75a and 76a which enter holes 175 and 176, respectively, in the ends of the record strip. Preferably, the feed rolls 75 and 76 are geared together, as best shown in Figure 7, by a shaft 77. The latter carries gears 78 and 79 at its opposite ends, the gear 78 meshing with a gear 80 which is carried by the feed roll 75 and the gear 79 meshing with a gear 81 which is carried by the feed roll 76. The gearing together of the feed rolls 75 and 76 is for the purpose of maintaining the portion of the strip between the rolls under the desired tension so as to insure accuracy in registration of the perforations in the record strip with the aligned apertures in the cover 60a and die plate 63. In order to insure such accuracy and at the same time enable build-up of the record on one roll or the other, with the resultant variations in the speeds of the two rolls, a coil spring 75b is interposed, as best shown in Figure 4, between the roll 75 and the gear 80. The latter, as shown, is carried by a stub shaft 80a upon which the adjacent end of the roll 75 is freely journaled. The inner end of the stub shaft 80a is connected by the spring 75b to a cross-pin 80b carried by the feed roll 75 and the spring 75b is pre-loaded torsionally at the time the record strip is installed. Consequently, the spring 75b is operative to maintain the desired tension upon the section of the record strip between the feed rolls despite variations in the relative circumferential speed of the feed rolls as a result of the build-up on one or the other of the record strip as it is advanced for the purpose described.

Means is provided whereby the record strip 100 may be advanced step-by-step as playing of the game progresses. The said means is best illustrated in Figures 4, 8 and 9 and includes a rock shaft 91 which carries an arm 93. The outer end of the latter is forked and carries a feed bar 94 between its ends. At its outer end, the feed bar 94 carries spaced-apart teeth 94a which are located at opposite sides of, and which cooperate with, a ratchet wheel 76c, the feed bar 94 being slotted as being indicated at 95 in Figure 9 to accommodate pins 96 carried by the fork end of the arm 93. The slots 95 permit, within limits, lengthwise movements of the feed bar 94 with respect to the end of the arm 93. Such movements, however, are resisted to some extent by a spring finger 97, one end of which is fixed to the arm 93 and the free end of which bears against the feed bar 94.

A push-pin 98 is carried by the cover 60a above the feed bar 94 and may be depressed to move the latter downwardly and, in so doing, cause the outermost of the teeth 94a on the feed bar to engage one of the teeth on the ratchet wheel 76c and thereby turn the latter, together with the roller 75, in a clockwise direction to advance the record strip one step, it being noted that the push-pin 98 is located at one side of the device within convenient reach of the player at that side.

Figure 5:
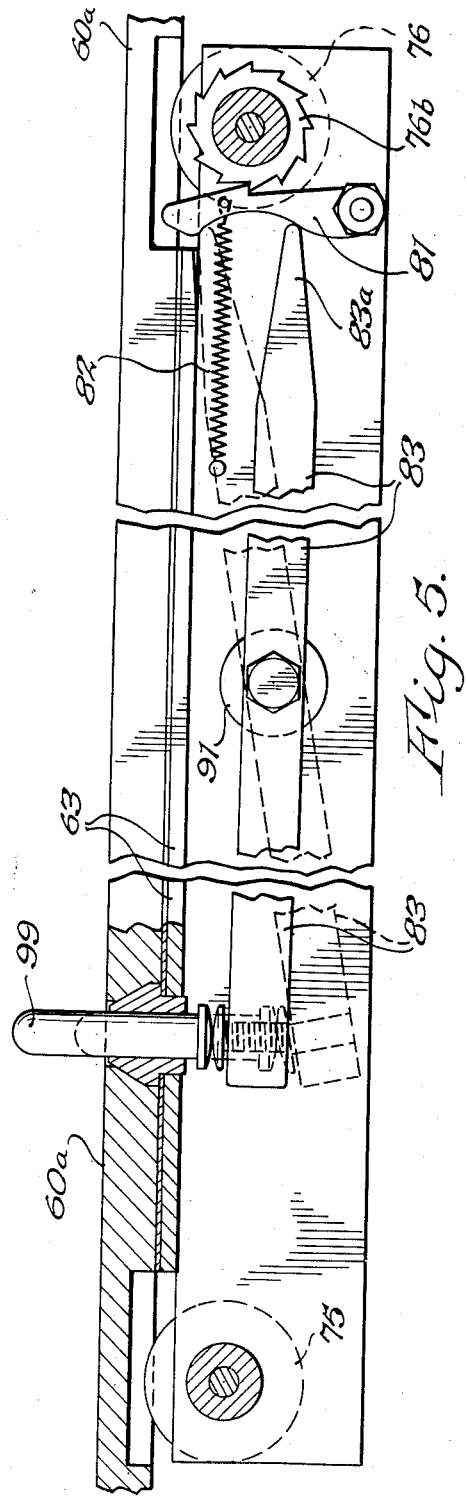
Figure 5 is an enlarged fragmentary sectional view taken along line 5—5 of Figure 3.

At its opposite end, the rock shaft 91 carries a second arm 83 (best shown in Figure 5). A push-pin 99, which is located at the opposite side of the device within convenient reach of the opposing player, is located in cooperating relation with one end of the lever 83 and may be depressed to the position indicated in dotted lines to rock the arm 93 in a direction opposite to that in which it was rocked by the push-pin 98. Hence when the push-pin 99 is depressed, as described, its movement is transmitted through the arm 83 and the rock shaft 91 to the arm 93. The free end of the feed bar 94, therefore, will, under such conditions, be elevated and the inner tooth 94a carried thereby will engage a tooth of the ratchet wheel 76c to turn the latter, and hence the roll 76, in a clockwise direction to advance the record strip another step. Thus as the push-pins 98 and 99 are alternately depressed, the record strip will be advanced step-by-step in the same direction beneath the apertures 61 in the cover 60a.

In order to assure accurate feeding of the record strip by the rolls 75 and 76 in the manner described, the roll 76 carries an escapement wheel 76b, the latter being located at the opposite end of the roll with respect to the ratchet wheel 76c and cooperating with a latching element 81, the said latching element being normally held in engagement with the wheel 76b by a cam extension 83a on the arm 83 (as best shown in Figure 5) and being normally biased toward a disengaging position by a spring 82. It will be noted that the edge of the latching element 81 with which the cam extension 83a cooperates is arcuate in shape so that at opposite limits of its range of movement, the cam extension 83a will engage the latching element 81 to hold it in a position in which turning movement of the wheel 76b, and hence turning movement of the feed roll 76, will be prevented. Midway between the two limits referred to, the arcuate edge of the latching element 81 is of considerably shorter radius than that of the path of travel of the cam extension 83a. Hence as the cam extension moves away from either of the two limits shown in Figure 5, toward the opposite limit, it will release the latching element 81 so that the spring 82 will disengage it from the escapement wheel 76b. It will thus be apparent that during the initial part of any rocking movement of the rock shaft 91, as a result of the depression of either of the push-pins 98 or 99, the cam extension 83a will be moved to release the latching element 81 so that the ratchet wheel 76c may be turned in the manner described to rotate the feed roll. During the final portion of the rocking movement of the rock shaft 91 the latching element 81 will be moved to a position to arrest the escapement wheel 76b at the desired position of the record strip. In this manner accurate feeding of the latter is insured.

Referring particularly to Figure 8, it will be noted that the push-pin 98 has been depressed to move the feed bar 94 downwardly and in so doing cause the tooth 94a at the outer end of said bar to move the ratchet wheel 76c one step, at which point the cam extension 83a (Figure 5) has acted upon the latching element 81 to cause it to engage the escapement wheel 76b and prevent further turning of the rolls 75 and 76, it being noted that as the push-pin 98 is depressed, as described, the push-pin 99 is elevated. The push-pin 99 may then be depressed first to effect the release of latching element 81 and then cause the inner tooth 94a on the feed bar 94 to engage the ratchet wheel 76c and turn the latter another step as the feed bar 94 moves in the direction of the dotted line position shown in Figure 8. As the upward movement of the feed bar 94 continues, it is elevated to the position shown in Figure 9, during which movement the push-pin 98 is elevated and at the conclusion of which movement the latching element 81 engages the escapement wheel 76b to arrest further movement of the feed rolls.

It will be noted that as the shaft 91 is rocked, in the manner described, the feed bar 94 may move back-and-forth on the pins 96 against the slight resistance offered by the spring finger 97 under the influence of the teeth of the ratchet wheel 76c. This assures the proper positioning of the teeth 94a on the feed bar with respect to the teeth on the opposite sides of the ratchet wheel.

The feed mechanism described has the advantage that advancing movements of the record strip are accurately controlled so that proper registering of the indicia-providing perforations in the record strip with the aligned apertures in the cover 60a and die plate 63 is insured.

Referring to Figures 1, 2 and 3, it will be noted that the aligned apertures in the cover and die plate of the device are arranged in a plurality of parallel, linear series which extend at an angle with respect to the marginal edges of the record strip and the line of travel of the latter. Preferably, this angular relation and the spacing of the various series of aligned apertures is such that only one pair of aligned apertures will be located along any line parallel to the line of travel of the record strip, this being clearly illustrated in Figure 3. The arrangement of the apertures in the cover and die plate in the manner described has the advantage that the capacity of the record with respect to the number of perforations which it may carry is substantially increased. Hence the number of games, or moves, which a record form may carry is correspondingly increased. There is another important advantage. Any aperture which is formed in the record strip travels in a different linear path than any other aperture formed in the record strip representing a checkered area of the same series, or of a different series. Consequently, even though the record strip may carry perforations representing moves involving a plurality of checkered squares in the same series, the perforations will control the passage of light through the apertures in the cover in such a manner that the specific moves, in their proper sequences, will be indicated as the record strip is advanced step-by-step in the manner described.

In the use of the device, playing pieces of the type disclosed in my co-pending application, Serial No. 155,149, may be employed so that the light emitted through the perforations in the record strip may be clearly seen through the game piece, although any other suitable type of game piece may be utilized if so desired.

From the foregoing it will be apparent that the device described is available for use in connection with the teaching of various games, such as checkers, chess, and the like, is available for use by the expert as well as by the student, and may be incorporated in game boards in such a manner as to form an integral part thereof without interfering in any way with the normal use of the game board when the device is not being employed.

The device has been illustrated and described in connection with games, specifically chess and checkers. It is to be understood, however, that this is intended by way of example only and that the advantages of the invention may be attained by the use of the device in various environments in which indicating and recordings for different purposes may be desired.

I claim as my invention:

1. Game apparatus of the character described comprising a support, a game board carried by said support and having a plurality of apertures arranged therein in a pattern corresponding to positions to which game pieces may be moved, a supply roller and a take-up roller rotatably mounted on said support in parallel, spaced relation, a record strip secured at opposite ends to said rollers and movable therebetween under said board, means for rotating said rollers to advance said record strip step-by-step to move indicating elements carried thereby into registration with said apertures and in so doing indicate the moves of said game pieces, said means including a shaft, a pair of oppositely-extending arms carried by said shaft, a movable element at one side of said game board which cooperates with one of said arms to rock said shaft in one direction, a movable element at the opposite side of said board which cooperates with the other of said arms to rock said shaft in the opposite direction, and means connecting said shaft to one of said rollers, whereby the rocking movements of said shaft in opposite directions will turn said one roller to advance said record strip step-by-step in the same direction.

2. Game apparatus of the character described comprising a support, a game board carried by said support and having a plurality of apertures arranged therein in a pattern corresponding to positions to which game pieces may be moved, a supply roll and a take-up roll mounted on said support in parallel, spaced relation, a record strip secured at opposite ends to said rolls and movable therebetween under said board, means for rotating said rolls to advance said record strip to move indicating elements carried thereby into registration with said apertures and in so doing indicate the moves of said game pieces, said means including a shaft, a pair of oppositely-extending arms carried by said shaft, a movable element at one side of said game board which cooperates with one of said arms to rock said shaft in one direction, a movable element at the opposite side of said board which cooperates with the other of said arms to rock said shaft in the opposite direction, means connecting said shaft to one of said rolls, whereby the rocking movements of said shaft in opposite directions will turn said one roll to advance said record strip step-by-step in the same direction, and means for arresting said rolls after they are moved through a predetermined angular distance by said first mentioned means.

3. Game apparatus of the character described comprising a support, a game board carried by said support and having a plurality of apertures arranged therein in a pattern corresponding to positions to which game pieces may be moved, a supply roll and a take-up roll mounted on said support in parallel, spaced relation, a record strip secured at opposite ends to said rolls and movable therebetween under said board, means for rotating said rolls to advance said record strip to move indicating means carried thereby into registration with said apertures and in so doing indicate the moves of said game pieces, said means including a shaft, a pair of oppositely-extending arms carried by said shaft, a depressible element mounted on said support at one side of said game board which cooperates with one of said arms to rock said shaft in one direction, a depressible element mounted on said support at the opposite side of said board which cooperates with the other of said arms to rock said shaft in the opposite direction, one of said elements occupying a depressed position when the other occupies an elevated position, and means connecting said shaft to one of said rolls, whereby the rocking movements of said shaft in opposite directions will turn said one roll to advance said record strip step-by-step in the same direction, the rocking of said shaft by the depression of the element which is elevated automatically restoring the other of said elements to an elevated position.

4. Game apparatus of the character described comprising a support, a game board carried by said support and having a plurality of apertures arranged therein in a pattern corresponding to positions to which game pieces may be moved, a supply roll and a take-up roll mounted on said support in parallel, spaced relation, a record strip secured at opposite ends to said rolls and movable therebetween under said board, a ratchet wheel on one of said rolls, means for rotating said one roll to advance said record strip to move spaced indicating elements carried thereby into registration with said apertures and in so doing indicate the moves of said game pieces, said means including a shaft, a pair of oppositely-extending arms carried by said shaft, one of said arms being operable to turn said ratchet wheel, a movable element at one side of said game board which cooperates with one of said arms to rock said shaft in one direction, a movable element at the opposite side of said board which cooperates with the other of said arms to rock said shaft in the opposite direction, and means connecting said shaft to one of said rolls, whereby the rocking movements of said shaft in opposite directions will cause said first mentioned arm to actuate said ratchet wheel and thereby turn said one roll to advance said record strip step-by-step in the same direction.

5. Game apparatus of the character described comprising a support, a game board carried by said support and having a plurality of apertures arranged therein in a pattern corresponding to positions to which game pieces may be moved, a supply roll and a take-up roll mounted on said support in parallel, spaced relation, a record strip secured at opposite ends to said rolls and movable therebetween under said board, a ratchet wheel on one of said rolls, a toothed escapement wheel on one of said rolls, a latching element associated with said escapement wheel, means for rotating said rolls to advance said record strip to move spaced indicating means carried thereby into registration with said windows and in so doing indicate the moves of said game pieces, said means including a shaft, oppositely-extending arms carried by said support on one side of said shaft, said arms being operable to turn said ratchet wheel and thereby turn said rolls and a third arm at the other extremity of said shaft, said third arm being operable to cause said latching element to engage said escapement wheel to arrest said rolls at predetermined angular positions and hold them against further turning movement, a movable element at one side of said game board which cooperates with one of said arms to rock said shaft in one direction, a movable element at the opposite side of said board which cooperates with the opposite of said arms to rock said shaft in the opposite direction, and means connecting said shaft to one of said rolls, whereby rocking movements of said shaft in opposite directions will cause said first mentioned arm to actuate said ratchet wheel and thereby turn said rolls to advance said record strip step-by-step in the same direction.

6. Game apparatus of the character described comprising a support, a game board carried by said support and having a plurality of apertures arranged therein in a pattern corresponding to the positions to which game pieces may be moved, a supply roll and a take-up roll mounted on said support in parallel, spaced relation, a record strip secured at opposite ends to said rolls and movable therebetween under said board, means for driving one of said rolls, and means connecting said last mentioned roll to the companion roll so that the two may be caused to turn in unison, said last mentioned means including a pre-loaded spring which is operative to permit said rolls to turn at different relative speeds to compensate for differences in the amount of record on the rolls and thereby maintain the portion of the record between the rolls under the desired predetermined tension.

7. Game apparatus of the character described comprising a support, a game board carried by said support and having a plurality of apertures arranged therein in a pattern corresponding to the positions to which game pieces may be moved, a supply roll and a take-up roll mounted on said support in parallel, spaced relation, a record strip secured at opposite ends to said rolls and movable therebetween under said board, one of said rolls being tubular, means for driving one of said rolls, and means for connecting said rolls so that they will be caused to turn in unison, said last mentioned means including a spring which is located in said tubular roll and which is pre-loaded torsionally, said spring being operative to permit the rolls to turn at different relative speeds to compensate for differences in the amount of record strip on the rolls and thereby maintain the portion of the record between the rolls under the desired predetermined tension.

8. Game apparatus of the character described for indicating moves of gamepieces in a game of checkers, chess, or the like, comprising a support, a gameboard carried by said support, and having a playing surface marked off thereon in a plurality of playing spaces for the gamepieces, said gameboard having apertures therethrough arranged in a pattern corresponding to positions which the gamepieces may occupy in playing the game, a supply roller and a take-up roller rotatably mounted on said support in parallel, spaced relation, a record strip secured at opposite ends to said rollers to be movable step-by-step from said supply roller to said take-up roller, said record strip having light-transmitting means therein to indicate moves of gamepieces, means extending between said rollers for guiding said record strip beneath said gameboard in its travel from said supply roller to said take-up roller, and a light source mounted on said support beneath said record strip so that light from said source may pass through said light-transmitting means and said apertures, when aligned, to indicate moves of said gamepieces.

9. Game apparatus of the character described for indicating moves of gamepieces in a game of checkers, chess, or the like, comprising a support, a gameboard carried by said support and having a playing surface marked off thereon in a plurality of identical playing squares which have apertures therethrough, each of said apertures being located in a separate square, and said apertures being arranged in a pattern corresponding to positions which the gamepieces may occupy in playing the game, a supply roller and a take-up roller rotatably mounted on said support in parallel, spaced relation, a record strip secured at opposite ends to said rollers to be movable step-by-step from said supply roller to said take-up roller, said record strip having apertures therein to indicate moves of gamepieces, means for guiding said record strip beneath said gameboard in its travel from said supply roller to said take-up roller, a light source mounted on said support beneath the portion of said record strip that extends from the supply roller to the take-up roller so that light may pass through the apertures in said record strip and the apertures in said gameboard, when aligned, to indicate moves of said gamepieces, and means for advancing said record strip step-by-step from said supply roller to said take-up roller.

10. Game apparatus of the character described for indicating moves of gamepieces in a game of checkers, chess, or the like, comprising a support, a gameboard carried by said support and having a playing surface marked off thereon in a plurality of identical playing squares which have apertures therethrough, each of said apertures being located in a separate square, and said apertures being arranged in a pattern corresponding to positions which the gamepieces may occupy in playing the game, a supply roller and a take-up roller rotatably mounted on said support in parallel, spaced relation, a record strip secured at opposite ends to said rollers to be movable step-by-step from said supply roller to said take-up roller, said record strip having apertures therein to indicate moves of gamepieces, means for guiding said record strip beneath said gameboard in its travel from said supply roller to said take-up roller to move in a path inclined to the sides of said playing squares, a light source mounted on said support beneath the portion of said record strip that extends from said supply roller to said take-up roller so that light may pass through the apertures in said record strip and the apertures in said gameboard, when aligned, to indicate moves of said gamepieces, means for advancing said record strip step-by-step from said supply roller to said take-up roller, and means for controlling said advancing movement so that each stepwise movement is arrested after a predetermined advancing movement of said record strip.

11. Game apparatus of the character described for indicating moves of gamepieces in a game of checkers, chess, or the like, comprising a support, a gameboard carried by said support and having a playing surface marked off thereon in a plurality of identical playing squares which have apertures therethrough, each of said apertures being located in a separate square, said apertures being arranged in a plurality of linear series and in a pattern corresponding to positions which the gamepieces may occupy in playing the game, a supply roller and a take-up roller rotatably mounted on said support in parallel, spaced relation, a record strip secured at opposite ends to said rollers to be movable step-by-step from said supply roller to said take-up roller, said record strip having apertures therein to indicate moves of gamepieces, means for guiding said record strip beneath said gameboard in its travel from said supply roller to said take-up roller to move in a path inclined to the sides of said playing squares, a sinuous tubular light having straight sections, said light being mounted on said support beneath the portion of said record strip that extends from said supply roller to said take-up roller so that said straight sections are coextensive with the several linear series of apertures in said gameboard and so that light may pass through the apertures in said record strip and the apertures in said gameboard, when aligned, to indicate moves of said gamepieces, and means for advancing said record strip step-by-step from said supply roller to said take-up roller.

12. Game apparatus of the character described comprising a support, a gameboard carried by said support and having a plurality of apertures arranged in a pattern corresponding to positions to which gamepieces may be moved, a supply roller and a take-up roller journaled in parallel, spaced relation on said support, a record strip secured at opposite ends to said supply roller and said take-up roller, respectively, and positioned to extend beneath said gameboard, said record strip being provided with a plurality of spaced indicating elements, and means for rotating one of said rollers step-by-step to advance said record strip step-by-step to move said indicating elements progressively into registry with said apertures, said means including a shaft, means at one side of said gameboard for rocking said shaft in one direction, means at the opposite side of said gameboard for rocking said shaft in the opposite direction, and means connecting said shaft to said one roller, whereby the rocking movements of said shaft in opposite directions will turn said one roller to advance said record strip step-by-step in the same direction.

GEORGE F. WALES.

References Cited in the file of this patent
UNITED STATES PATENTS

| Number | Name | Date |
|---|---|---|
| 471,066 | Tack | Mar. 15, 1892 |
| 529,913 | Howell | Nov. 27, 1894 |
| 1,532,069 | Ortiz et al. | Mar. 31, 1925 |
| 1,644,160 | Thompson | Oct. 4, 1927 |
| 1,730,640 | Brownell | Oct. 8, 1929 |
| 1,750,539 | Paukon | Mar. 11, 1930 |
| 1,928,565 | Kindig | Sept. 26, 1933 |
| 2,063,331 | Nagel | Dec. 8, 1936 |
| 2,189,504 | Klaus | Feb. 6, 1940 |
| 2,490,092 | Rippenbein | Dec. 6, 1949 |
| 2,507,916 | Lister | May 16, 1950 |
| 2,543,339 | Simunek | Feb. 27, 1951 |

FOREIGN PATENTS

| Number | Country | Date |
|---|---|---|
| 7,770 | Great Britain | 1896 |
| 369,283 | Germany | Feb. 17, 1923 |